(12) United States Patent
Robinson et al.

(10) Patent No.: US 11,341,684 B1
(45) Date of Patent: May 24, 2022

(54) CALIBRATION OF DETECTION SYSTEM TO VEHICLE USING A MIRROR

(71) Applicant: Waymo LLC, Mountain View, CA (US)

(72) Inventors: Craig Lewin Robinson, Palo Alto, CA (US); Volker Grabe, Redwood City, CA (US); Colin Braley, Mountain View, CA (US); Zachary Morriss, San Francisco, CA (US); Stephanie McArthur, Mountain View, CA (US); Andrew Crawford, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/163,772

(22) Filed: Feb. 1, 2021

Related U.S. Application Data

(63) Continuation of application No. 16/032,417, filed on Jul. 11, 2018, now Pat. No. 10,943,367.

(51) Int. Cl.
*B60R 1/12* (2006.01)
*B60W 50/00* (2006.01)
*G06T 7/80* (2017.01)

(52) U.S. Cl.
CPC ............... *G06T 7/80* (2017.01); *B60R 1/12* (2013.01); *B60W 50/00* (2013.01); *B60W 2050/0083* (2013.01); *G06T 2207/20048* (2013.01); *G06T 2207/30252* (2013.01)

(58) Field of Classification Search
CPC ............ G06T 7/80; G06T 2207/20048; G06T 2207/30252; B60R 1/12; B60W 50/00; B60W 2050/0083
See application file for complete search history.

(56) References Cited

U.S. PATENT DOCUMENTS

| 6,460,004 | B2 | 10/2002 | Greer et al. |
| 7,321,839 | B2 | 1/2008 | Maeda et al. |
| 2006/0290920 | A1 | 12/2006 | Kaempchen et al. |

(Continued)

OTHER PUBLICATIONS

Gillberg, et al., "Target Extrinsic Calibration of Vehicle Mounted Lidars", Master's thesis, Chalmers University of Technology, Gothenburg, Sweden, 2016, 78 pages.

*Primary Examiner* — Mischita L Henson
(74) *Attorney, Agent, or Firm* — Botos Churchill IP Law (57) ABSTRACT

The disclosure provides for a method of calibrating a detection system that is mounted on a vehicle. The method includes detecting characteristics of the mirror and characteristics of a vehicle portion using the detection system. The mirror reflects the vehicle portion to be detected using the detection system. The method also includes determining a first transform based on the detected one or more of mirror characteristics, determining a second transform based on the one or more vehicle portion characteristics, and determining a third transform based on a known position of the vehicle portion in relation to the vehicle. Further, the method includes determining a position of the detection system relative to the vehicle based on the first, second, and third transforms and then calibrating the detection system using the determined position of the detection system relative to the vehicle.

20 Claims, 7 Drawing Sheets

(56) References Cited

U.S. PATENT DOCUMENTS

| | | | |
|---|---|---|---|
| 2009/0051935 A1* | 2/2009 | Cooper | G02B 26/101 |
| | | | 356/616 |
| 2012/0249774 A1 | 10/2012 | Johnson et al. | |
| 2018/0004219 A1* | 1/2018 | Aldred | B60L 1/003 |
| 2018/0011196 A1 | 1/2018 | Pennecot et al. | |
| 2020/0322545 A1* | 10/2020 | Magnuszewski | G03B 37/00 |
| 2020/0341118 A1* | 10/2020 | Chen | B60W 10/20 |

* cited by examiner

CALIBRATION OF DETECTION SYSTEM TO VEHICLE USING A MIRROR

CROSS REFERENCE TO RELATED APPLICATIONS

The present application is a continuation of U.S. patent application Ser. No. 16/032,417, filed Jul. 11, 2018, the entire disclosure of which is incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous tasks while the autonomous vehicle is in motion, which ultimately leads to decisions, such as speeding up, slowing down, stopping, turning, etc. The perception system may include a plurality of detection systems, such as cameras, radar units, lidar sensors, microphones, global positioning devices, etc., that gather and interpret information about the vehicle's surrounding environment, e.g., parked cars, trees, buildings, etc.

BRIEF SUMMARY

Aspects of the disclosure provide for a method of calibrating a detection system that is mounted on a vehicle. The method includes using one or more computing devices to detect one or more characteristics of a mirror using the detection system, wherein the mirror reflects at least a portion of the vehicle to the detection system, and to determine a first transform based on the detected one or more of mirror characteristics. The method also includes using the one or more computing devices to detect one or more characteristics of the vehicle portion reflected in the mirror using the detection system and to determine a second transform based on the one or more vehicle portion characteristics. Additionally, the method includes using the one or more computing devices to determine a third transform based on a known position of the vehicle portion in relation to the vehicle and to determine a position of the detection system relative to the vehicle based on the first, second, and third transforms. The method also includes using the one or more computing devices to calibrate the detection system using the determined position of the detection system relative to the vehicle.

In one example, determining the first transform includes comparing the detected one or more mirror characteristics with one or more known mirror characteristics. In another example, the detected one or more mirror characteristics includes a plurality of fiducials on or around the mirror. In yet another example, determining the second transform includes comparing the detected one or more vehicle portion characteristics with known one or more vehicle portion characteristics.

In a further example, the detected one or more vehicle portion characteristics includes fiducials on the vehicle portion. In another example, the detection system is a first detection system, and the one or more mirror characteristics or the one or more vehicle portion characteristics are detected using a second detection system with the first detection system. In a still further example, the detection system is a first detection system, and the method also includes calibrating a second detection system based on the calibration of the first detection system.

Other aspects of the disclosure provide for a system. The system includes a detection system of a vehicle configured to detect a mirror in the vehicle's environment and a vehicle portion of the vehicle via the mirror. The system also includes one or more computing devices configured to detect one or more characteristics of the mirror using the detection system, wherein the mirror reflects at least the vehicle portion to the detection system, determine a first transform based on the detected one or more of mirror characteristics, detect one or more characteristics of the vehicle portion reflected in the mirror using the detection system, determine a second transform based on the one or more vehicle portion characteristics, determine a third transform based on a known position of the vehicle portion in relation to the vehicle, determine a position of the detection system relative to the vehicle based on the first, second, and third transforms, and calibrate the detection system using the determined position of the detection system relative to the vehicle.

In one example, the one or more computing devices are configured to determine the first transform by comparing the detected one or more mirror characteristics with one or more known mirror characteristics. In another example, the one or more computing devices are configured to determine the second transform by comparing the detected one or more vehicle portion characteristics with known one or more vehicle portion characteristics. In yet another example, the detection system is a first detection system, and the system also includes a second detection system configured to be used with the first detection system to detect the one or more mirror characteristics or the one or more vehicle portion characteristics.

In a further example, the detection system is a first detection system, the system also includes a second detection system, and the one or more computing devices are also configured to calibrate a second detection system based on the calibration of the first detection system. In another example, the system also includes the mirror. In a still further example, the system includes the vehicle.

Further aspects of the disclosure provide for another method of calibrating a first detection system that is mounted on a vehicle. The method includes detecting, using the first detection system in communication with one or more computing devices, at least one stationary object at a first relative pose and detecting, using a second detection system in communication with the one or more computing devices, the at least one stationary object. The second detection system is remote from the vehicle at a second relative pose. The method also includes determining, by the one or more computing devices, a first transform based on the first relative pose and the second relative pose of the detected at least one stationary object. Additionally, the method includes detecting, by the one or more computing devices, at least a portion of the vehicle using the second detection system and determining, by the one or more computing devices, a second transform based on one or more characteristics of the detected vehicle portion. The method then includes determining, by the one or more computing devices, a position of the first detection system relative to the vehicle based on the first and second transforms, and calibrating, by the one or more computing devices, the first detection system using the determined position of the first detection system relative to the vehicle.

In one example, determining the first transform includes comparing the first relative pose and the second relative pose. In another example, comparing the first relative pose and the second relative pose includes comparing first characteristics of the at least one stationary object detected by the first detection system and second characteristics of the at least one stationary object detected by the second detection system. In yet another example, determining the second transform includes comparing the one or more characteristics of the detected vehicle portion with known one or more vehicle portion characteristics.

In a further example, the one or more characteristics of the detected vehicle portion include fiducials on the vehicle portion. In another example, the method also includes determining, by the one or more computing devices, a third transform based on a known position of the vehicle portion in relation to the vehicle. In this example, determining the position of the first detection system relative to the vehicle is further based on the third transform.

DETAILED DESCRIPTION

Overview

The technology relates to calibrating a plurality of detection systems in a vehicle using one or more mirrors. A detection system may be mounted on a vehicle and may be configured to provide sensor data to the vehicle's computing devices. A mirror may be positioned at a given location in proximity to a vehicle with a given orientation. The location and orientation of the mirror may allow the detection system to detect at least a portion of the vehicle through the mirror. A plurality of first fiducials may be positioned on and/or around the mirror. A plurality of second fiducials may be positioned on the portion of the vehicle.

To calibrate the detection system, the vehicle's computing devices may operate the detection system to detect the portion of the vehicle and determine the location of the detection system relative to the vehicle. Determining the location of the detection system relative to the vehicle may include determining a first, second, and third transform.

To determine a first transform, the vehicle's computing devices may use the detection system to detect the plurality of first fiducials of the mirror and the plurality of second fiducials through the mirror. The vehicle's computing devices may determine the location and the orientation of the mirror relative to the detection device based on the location of the detected plurality of first fiducials. This relative location and orientation may correspond to a first transform between the vehicle and the mirror.

To determine the second transform, the vehicle's computing devices may use the detection device to detect the vehicle portion reflected in or from the mirror. In addition, the detection device may detect characteristics of the detected vehicle portion including the plurality of second fiducials on the vehicle portion. The vehicle's computing devices may determine a perceived location and perceived orientation of the vehicle portion based on the location of the detected plurality of second fiducials. This relative location and orientation of the vehicle portion may correspond to a second transform between the detection device and the perceived vehicle portion. An actual location of the detected vehicle portion may then be determined using the first transform and the second transform.

The third transform may be determined by the vehicle's computing devices based on a known location of the detected vehicle portion in the vehicle, such as from design information. The third transform may define the relationship of the detected vehicle portion with respect to other portions of the vehicle.

To determine the location and orientation of the first detection system relative to the vehicle, the one or more processors may combine the first, second, and third transforms. The determined location and orientation of the first detection system relative to the vehicle may be stored in a memory and used to calibrate the first detection system. In addition, a calibration of one or more other detection systems in the plurality of detection systems may be determined based on the calibrated first detection system.

The features described herein may allow detection systems of autonomous or semi-autonomous vehicles to be properly calibrated for operation in fast and efficient ways, making the operation of such vehicles safer. Setup for this calibration process merely includes positioning one or more mirrors around a vehicle such that a detection system of the vehicle may detect a portion of the vehicle via the one or more mirrors. The calibration process may therefore be performed while the vehicle is stationary in any type of location and optionally indoors. The detection systems may therefore be calibrated in smaller areas than if using other calibration processes and with less vehicle maneuvering. Quicker calibration means vehicles may be sent to pick-up passengers and/or cargo in a more timely fashion, even as demand fluctuates. In addition, fewer resources, such as fuel, time, and manpower, are required in the preparation of an autonomous vehicle for service, which may reduce overall costs of transportation services using such autonomous vehicles.

Example Systems

Figure 1:
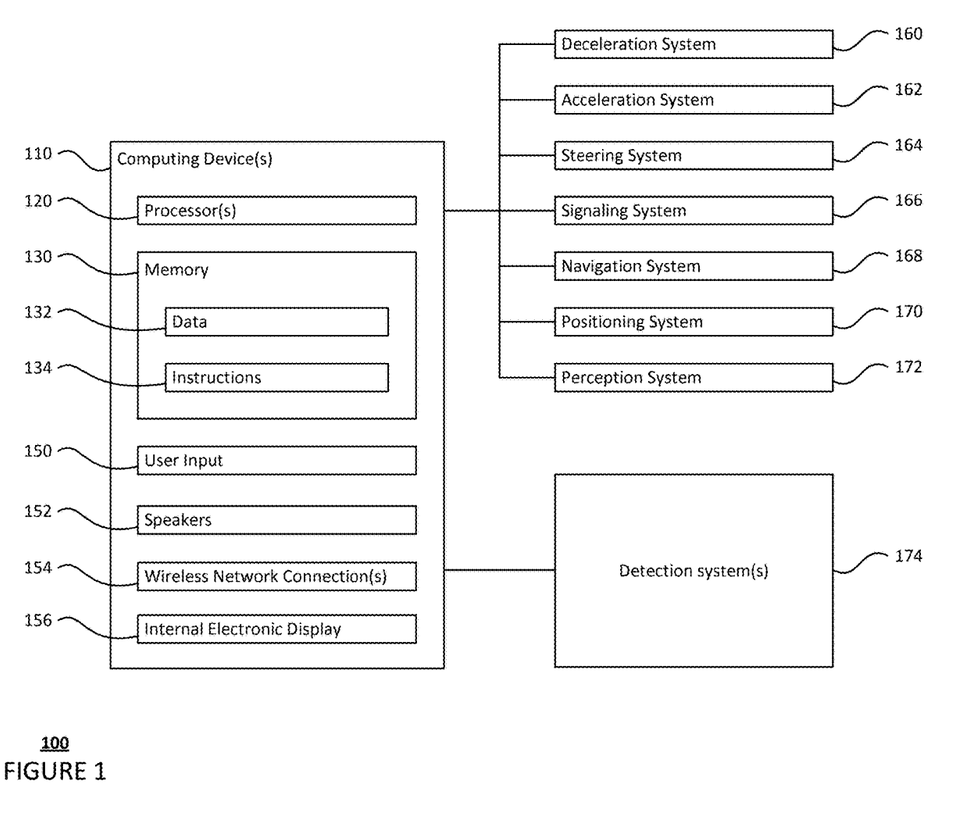
FIG. 1 is a functional diagram of a vehicle 100 in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle 100 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle 100 may have one or more computing devices 110 that include one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the vehicle's computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 110. Accordingly, references to a processor or computing device will be understood to include references to a collection of processors or computing devices or memories that may or may not operate in parallel.

The vehicle's computing devices 110 may have all of the components normally used in connection with a computing device such as the processor and memory described above, as well as a user input 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle 100 includes an internal electronic display 156. In this regard, internal electronic display 156 may be located within a cabin of vehicle 100 and may be used by the vehicle's computing devices 110 to provide information to passengers within the vehicle 100.

In one example, the vehicle's computing devices 110 may be part of an autonomous driving computing system incorporated into vehicle 100. The autonomous driving computing system may capable of communicating with various components of the vehicle 100 as needed in order to control the vehicle 100 in fully autonomous (without input from a driver) as well as semi-autonomous (some input from a driver) driving modes.

When engaged, the vehicle's computing devices 110 may control some or all of these functions of vehicle 100 and thus be fully or partially autonomous. It will be understood that although various systems and the vehicle's computing devices 110 are shown within vehicle 100, these elements may be external to vehicle 100 or physically separated by large distances. In this regard, the vehicle's computing devices 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to the vehicle's computing devices 110, in actuality, these systems may also be incorporated into the vehicle's computing devices 110, again as an autonomous driving computing system for controlling vehicle 100.

As an example, the vehicle's computing devices 110 may interact with deceleration system 160 and acceleration system 162 in order to control the speed of the vehicle 100. Similarly, steering system 164 may be used by the vehicle's computing devices 110 in order to control the direction of vehicle 100. For example, if vehicle 100 configured for use on a road, such as a car or truck, the steering system may include components to control the angle of wheels to turn the vehicle 100. Signaling system 166 may be used by the vehicle's computing devices 110 in order to signal the vehicle's intent to other drivers or vehicles, for example, by lighting turn signals or brake lights when needed.

Navigation system 168 may be used by the vehicle's computing devices 110 in order to determine and follow a route to a location. In this regard, the navigation system 168 and/or data 132 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Positioning system 170 may be used by the vehicle's computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle 100. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the vehicle's computing devices 110, such as an accelerometer, gyroscope or another direction/speed detection device to determine the direction and speed of the vehicle 100 or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the vehicle's computing devices 110, other computing devices and combinations of the foregoing.

The perception system 172 may include one or more components for detecting and performing analysis on objects external to the vehicle 100 such as other vehicles, obstacles in the road, traffic signals, signs, trees, etc. For example, the perception system 172 may include one or more detection systems 174, such as, for example, lasers, sonar units, radar units, cameras, or any other detection devices which record data which may be processed by the vehicle's computing devices 110. This data may describe the shape and geographic location coordinates of objects detected in the vehicle's environment.

Figure 2:
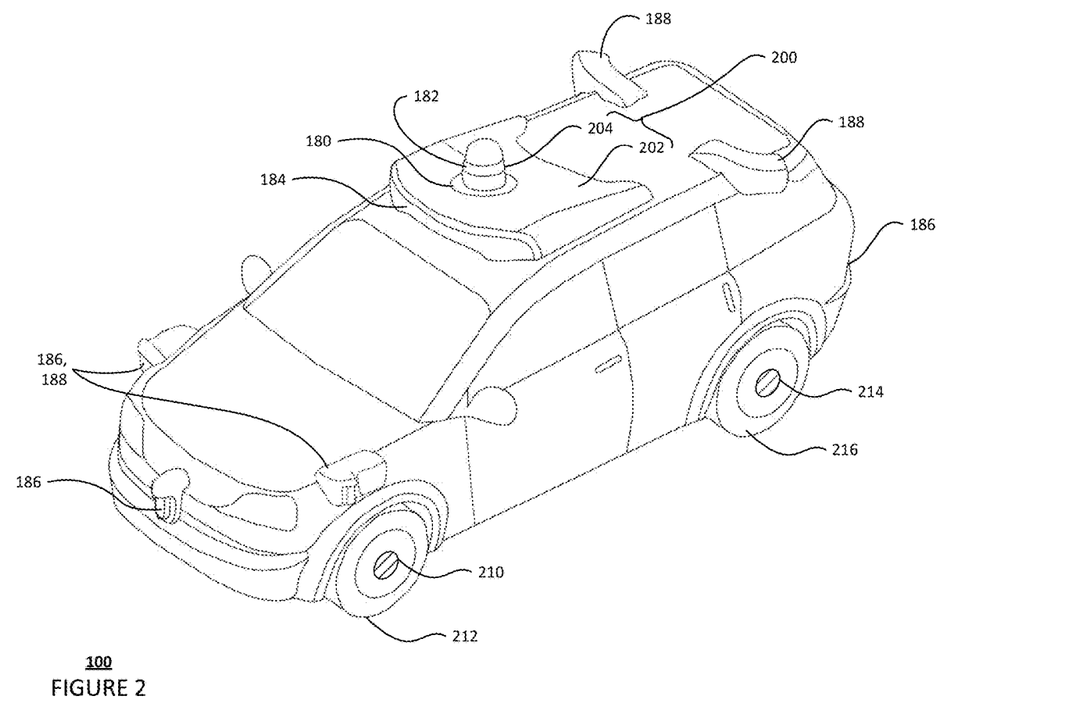
FIG. 2 is a pictorial diagram of a vehicle 100 in accordance with aspects of the disclosure.

The one or more detection systems 174 may form an object detection system configured to provide sensor data to the vehicle's computing devices 110. This sensor data may describe the shape and geographic location coordinates of objects detected in the vehicle's environment. Other sensor data collected by the plurality of detection systems may include, for example, reflectivity, speed, trajectory data, etc. The sensor data may be collected at one or more detection systems 174 using one or more sensors positioned on or in different portions of the vehicle 100. As shown in FIG. 2, the vehicle 100 may include a positioning box 200 mounted atop a roof of the vehicle 100 or in a different part of the vehicle 100. When mounted atop the roof of the vehicle 100, the positioning box 200 may include a dome that comprises a lower dome portion 202 and an upper dome portion 204 that are both configured to house one or more of the detection systems.

The one or more detection systems 174 may include an orientation or pose detection system 180, a short range detection system 182, a long range detection system 184, a blind spot detection system 186, or a radar detection system 188. The orientation or pose detection system 180 may include an inertial measurement unit configured to detect an orientation or pose of a positioning box 200. The short range detection system 182 may include one or more lidar systems configured to detect objects within a wide angle view and within a first range of distances from the vehicle 100. The long range detection system 184 may include one or more lidar systems configured to detect objects within a narrow angle view and within a set second range of distances from the vehicle 100 that reaches a farther distance than the set first range. The blind spot detection system 186 may include one or more lidar systems configured to detect objects in areas where the short range detection system and the long range detection system are less likely to reach, or blind spots. For example, objects below a particular height and within a particular distance from the vehicle 100 may be less likely to be detected by the short range detection system or the long range detection system that are positioned on top of the vehicle 100. The radar detection system 188 may include one or more radar systems configured to detect objects within a wide angle view.

As shown in FIG. 2, the sensors of the orientation or pose detection system 180 and the long range detection system 184 may be located at least partially within a lower dome portion 202 atop the roof of the vehicle 100. The sensors of the short range detection system 182 may be mounted at least partially within an upper dome portion 204 atop the lower dome portion. The sensors of the blind spot detection system 186 may be mounted on side mirrors, front bumper, rear bumper, or other locations on the vehicle 100 below or lower than the roof of the vehicle 100. The sensors of the radar detection system 188 may be mounted at or near one or more corners of the vehicle 100, or for instance at the corners on the roof of vehicle 100 or below. Different arrangements of the detection systems may also be utilized.

Of course, in some examples, the one or more detection systems 174 include additional detection systems that may include cameras, microphones, or other types of sensors. For example, one or more cameras may be mounted atop the vehicle 100, such as in the upper dome portion 204. Microphones or other types of sensors may be mounted atop the vehicle as well, such as in the lower dome portion 202.

On at least one portion of the vehicle 100, one or more vehicle fiducials may be fixed. For example, as shown in FIG. 2, vehicle fiducial 210 may be fixed on a front wheel 212 of vehicle 100, and vehicle fiducial 214 may be fixed on a back wheel 216 of vehicle 100. Each vehicle fiducial has a known shape, dimensions, and relative position with respect to the vehicle 100. For example, vehicle fiducials 210 and 214 may each be a circle shape with a 20 cm radius. Vehicle fiducial 210 may be positioned concentrically with the wheel 212 about a center axis of the wheel 212, and vehicle fiducial 214 may be positioned concentrically with the wheel 216 about a center axis of the wheel 216. In some implementations, each vehicle fiducial may include a visual identifier unique to that vehicle fiducial.

A mirror may be used to calibrate the one or more detection systems 174 of the vehicle 100. The mirror may have particular characteristics, including a reflective surface. Other characteristics of the mirror may include shape, dimension, or curvature. A plurality of mirror fiducials may be positioned on and/or around the reflective surface. Each mirror fiducial has particular characteristics, such as shape, dimension, or relative position with respect to another mirror fiducial and/or the reflective surface. In some implementations, each mirror fiducial may include a visual identifier unique to that mirror fiducial.

Figure 3:
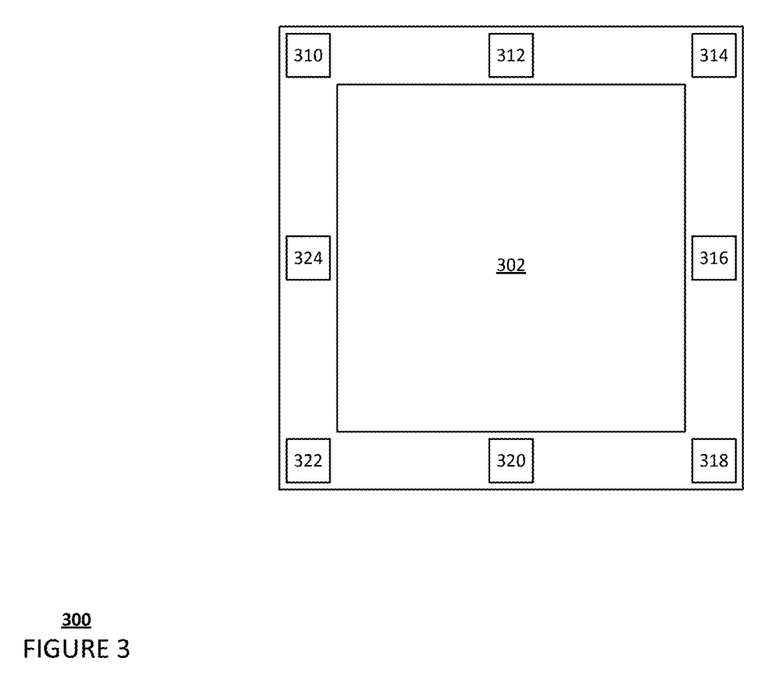
FIG. 3 is a pictorial diagram of a mirror 300 in accordance with aspects of the disclosure.

As shown in FIG. 3, the mirror 300 may be 1 meter by 1 meter and may include a flat reflective surface 302 and plurality of mirror fiducials 310, 312, 314, 316, 318, 320, 322, and 324 positioned around the edge of the reflective surface 302. The plurality of mirror fiducials 310, 312, 314, 316, 318, 320, 322, and 324 may each be a square shape with dimensions such as 10 cm by 10 cm. Mirror fiducial 310 is positioned at a first corner of the mirror 300; mirror fiducial 314 is at a second corner at least approximately 1 meter from the first corner; mirror fiducial 318 is at a third corner at least approximately 1 meter from the second corner; and mirror fiducial 322 is at a fourth corner at least approximately 1 meter from the first and third corners. Mirror fiducial 312 is positioned at least approximately halfway between the mirror fiducials 310 and 314, at least approximately 0.5 meters from each of the mirror fiducials 310 and 314; mirror fiducial 316 is positioned at least approximately halfway between the mirror fiducials 314 and 318, at least approximately 0.5 meters from each of the mirror fiducials 314 and 318; mirror fiducial 320 is positioned at least approximately halfway between the mirror fiducials 318 and 322, at least approximately 0.5 meters from each of the mirror fiducials 318 and 322; and mirror fiducial 324 is positioned at least approximately halfway between the mirror fiducials 322 and 310, at least approximately 0.5 meters from each of the mirror fiducials 322 and 310. In some implementations, the mirror 300 may include more than one reflective surface positioned coplanar to one another in order to form a larger reflective surface.

Example Methods

A given detection system of the one or more detection systems 174 may be calibrated to match the coordinate frame of the given detection system to that of the vehicle 100. The calibration may be performed after the given detection system is mounted to the vehicle 100 and prior to the vehicle's autonomous operation. The calibration may also be performed periodically, or as needed to address calibration errors or issues. After the calibration, locations of detected objects may be more accurately determined with respect the vehicle 100.

Figure 4A:
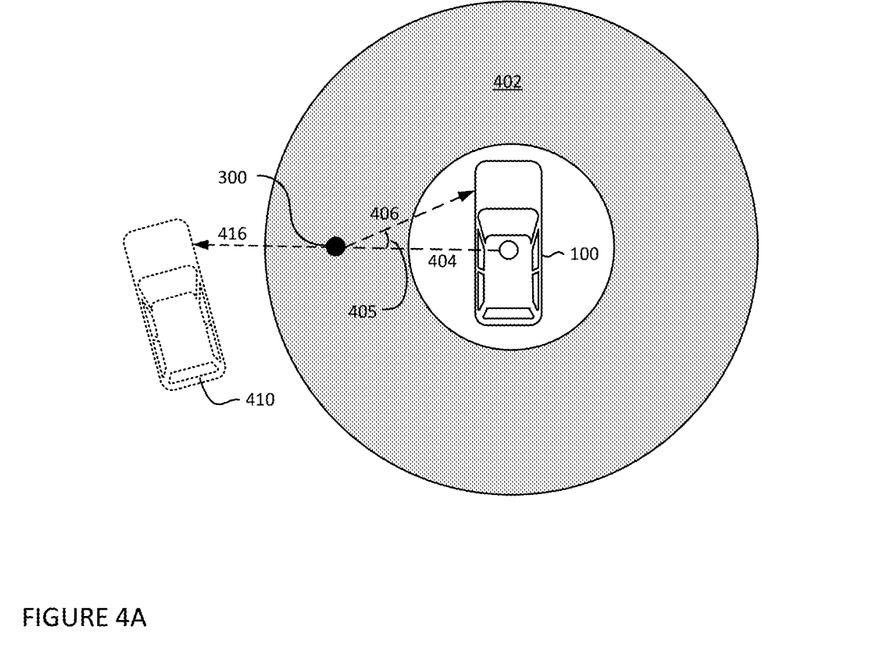
FIG. 4A is a pictorial diagram of a method in accordance with aspects of the disclosure.
Figure 4B:
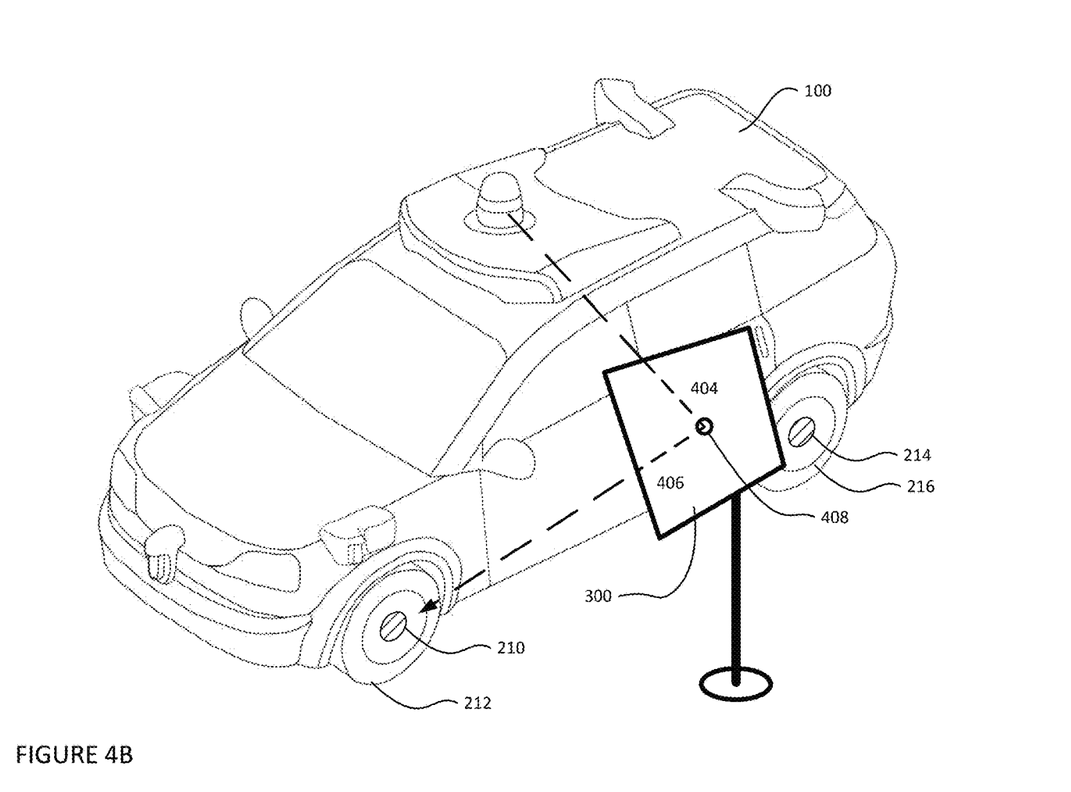
FIG. 4B is another pictorial diagram of the method shown in FIG. 4A in accordance with aspects of the disclosure.

The mirror may be positioned in proximity to a vehicle. The position of the mirror may allow the given detection system to detect at least a portion of the vehicle through the mirror when the mirror is a distance from the vehicle. The distance from a vehicle may be such that the mirror is within a range of the given detection system or rather close enough such that the given detection system is able to perceive the mirror, the mirror fiducials, and the portion of the vehicle reflected in the mirror, and not so close so as to overly limit the view of the mirror, the mirror fiducials, and the portion of the vehicle reflected in the mirror. For example, as shown in FIGS. 4A and 4B, the mirror may be placed at a distance of 5 meters to the left of a left side of the vehicle, which is within the range 402 of the given detection system. The distance may alternatively be more or less than 5 meters.

The mirror may also be angled such that a signal transmitted from the given detection system of the plurality of detection systems may be reflected off the mirror towards a particular vehicle portion. In the example in FIGS. 4A, 4B, and 4C, the location and angle of the mirror 300 allows the given detection system to detect a given vehicle portion such as a wheel 212 (shown in FIG. 2) of the vehicle 100, including vehicle fiducials 210, within the dimensions of the mirror. The one or more sensors of the given detection system may be positioned in the upper dome portion 204. A line-of-sight from the one or more sensors of the given detection system to the mirror is shown in the dashed line portion 404, and the reflected line-of-sight from the mirror to the wheel of the vehicle 100 is shown in the dashed line portion 406. The angle 405 between the dashed line portion 404 and the dashed line portion 406 is due to the location and angle of the mirror 300 relative to the given detection system.

Using the given detection system, the vehicle's computing devices 110 may detect the mirror and determine a location and orientation, or pose, of the mirror relative to the given detection system. Detecting the mirror may include detecting one or more mirror characteristics, such as shape, dimensions, lines, relative position of parts, one or more mirror fiducials, or other physical characteristics. When one or more of the plurality of mirror fiducials are detected, and the vehicle's computing devices 110 may determine a location and orientation, or pose, of the detected mirror fiducials. The location of the detected mirror fiducial relative to the given detection system may be identified using a coordinate system such as polar coordinates, Cartesian coordinates, etc. The orientation of the detected mirror fiducial relative to the given detection system may be identified as rotations about yaw, pitch, and roll axes relative to a known start orientation or relative to the coordinate frame of the given detection system. Any other type of orientation identification system may alternatively be used. The pose of the detected mirror fiducials may be determined based on the known characteristics of each mirror fiducial.

Figure 4C:
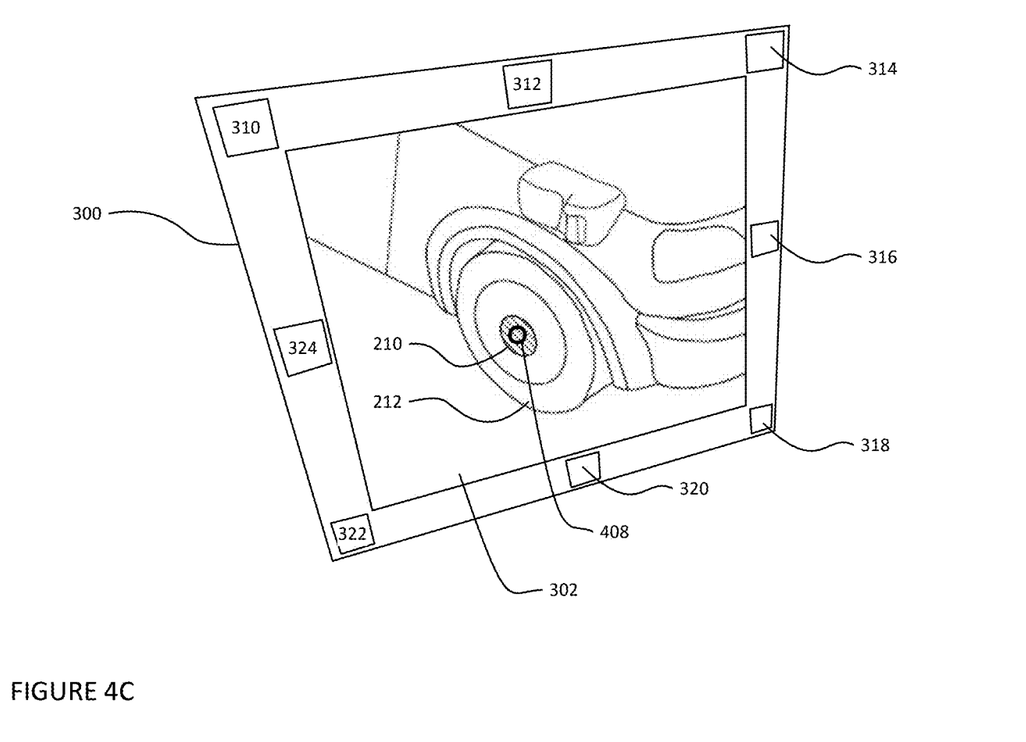
FIG. 4C is a further pictorial diagram of the method shown in FIGS. 4A and 4B in accordance with aspects of the disclosure.

For example, the vehicle's computing devices 110 may determine a location of the mirror fiducial 310 using the known dimensions of mirror fiducial 310 (10 cm by 10 cm) to extrapolate a distance and an angle of the mirror fiducial 310 from the given detection system, such as 4.85 meters from and 5 degrees lower than the given detection system. An orientation of the mirror fiducial 310 may be determined by comparing a detected shape of the mirror fiducial 310 to the known shape of mirror fiducial 310 (square), such as 15° yaw angle, 30° pitch angle, and 0° roll angle. When at an angle to the given detection system, the edges of mirror fiducial 310 may appear to be different lengths, as shown in FIGS. 4B and 4C. The dimensions and shape of the mirror fiducials may be pre-stored or otherwise accessible to the vehicle's computing devices 110, or, alternatively, an identifier of mirror fiducial 310 may be detected and used to identify the dimensions and shape of the mirror fiducial 310. Examples of identifiers may be a barcode or Quick Response (QR) code and may correspond to a lookup table stored at the vehicle, dimensions of a mirror fiducial, or shape of a mirror fiducial. In some implementations, the identifier may also identify the geographic location of the mirror fiducial 310. Mirror fiducials 312, 314, 316, 318, 320, 322, and 324 may be detected in a same or similar manner.

The pose of the mirror may then be determined by the vehicle's computing devices 110 based on the pose of one or more detected mirror fiducials. The location of the mirror may be identified using a coordinate system for the coordinate frame of the given detection system, such as spherical coordinates, Cartesian coordinates, etc. The orientation of the mirror relative to the given detection system may be identified as rotations about yaw, pitch, and roll axes relative to a known start orientation or relative to the coordinate frame of the given detection system. Any other type of orientation identification system may alternatively be used. The pose of the mirror 300 may be determined to be the same pose of the detected mirror fiducial 310. In other implementations, the pose of the mirror 300 may be determined based on the pose of the detected mirror fiducial 310 as well as a known position of the detected mirror fiducial 310 in the mirror 300. Because mirror fiducial 310 is in a corner of the mirror 300, which has dimensions of 1 meter by 1 meter, the edges of the mirror 300 may be extrapolated using the pose of the mirror fiducial 310.

Additionally or alternatively, more than one mirror fiducial may be used to determine or further refine the pose of the mirror. An arrangement of at least two mirror fiducials, for instance, may be detected. For mirror 300, the arrangement of the plurality of mirror fiducials 310, 312, 314, 316, 318, 320, 322, and 324 relative to one another may be detected. The vehicle's computing devices 110 may determine the pose of the mirror 300 more precisely by comparing the detected arrangement to a known arrangement for the mirror 300. Since the plurality of mirror fiducials 310, 312, 314, 316, 318, 320, 322, and 324 are positioned around the border of the mirror 300 forming a square outline, the vehicle's computing devices 110 may determine the pose of the mirror 300 based on detected distances between pairs of mirror fiducials.

The vehicle's computing devices 110 may determine a location of the mirror 300 using the known positions of the plurality of mirror fiducials relative to one another, such as approximately 0.5 meters from a neighboring mirror fiducial, to extrapolate a distance of the mirror 300 from the given detection system. In another example, the vehicle's computing devices 110 may average the locations of the plurality of mirror fiducials to determine the location of the mirror 300.

In addition or alternatively, the vehicle's computing devices 110 may determine a location on the mirror that corresponds with where the vehicle portion and/or a vehicle fiducial on the vehicle portion is reflected towards the given detection system. For this determination, the location of the detected vehicle portion and/or vehicle fiducial may be compared with the location of the plurality of mirror fiducials to determine the location on the mirror that corresponds to the reflection of the detected vehicle portion and/or vehicle fiducial. As shown in FIGS. 4B and 4C, the location on the mirror corresponding to the reflection of the vehicle fiducial 210, indicated by circle 408, may be determined based on the locations of the plurality of mirror fiducials of mirror 300. The location on the mirror may be determined to be (4.90 meters, 88°, −10°) relative to the given detection system, where 4.90 meters is the radial distance, 88° is the azimuth angle from a default starting pointing direction of the given detection system that is in a plane coplanar with the given detection system, and −10° is the altitude angle perpendicular from the plane coplanar with the given detection system.

An orientation of the mirror 300 relative to the given detection system may be using the detected plurality of mirror fiducials. In one example, the orientation of the mirror 300 may be the determined as the same as the orientation of at least one of the detected plurality of mirror fiducials, such as mirror fiducial 310's orientation—15 degrees yaw angle, 30 degrees pitch angle, and 0 degrees roll angle. In another example, the orientation of the mirror 300 may be determined by comparing the detected arrangement of the plurality of mirror fiducials to using the known positions of the plurality of mirror fiducials relative to one another. When at an angle, the distance between mirror fiducials 310 and 312 and the distance between mirror fiducials 312 and 314 may appear to be different lengths, though they are both at least approximately 0.5 meters. In other examples, a detected area of each mirror fiducial may be compared to determine the orientation of the mirror 300 since the plurality of mirror fiducials physically have the same area. In yet another example, the determined locations of each mirror fiducial may be used to map the outline of the mirror 300, and the orientation may be determined using the outline. The arrangement of the mirror fiducials may be pre-stored or otherwise accessible to the vehicle's computing devices 110, or, alternatively, an identifier of one or more mirror fiducials may be detected and used to identify the arrangement of the mirror fiducials.

In addition or alternatively, a second detection system, such as a camera, of the vehicle may be used to collect an image of the mirror from the vehicle. The vehicle's computing devices 110 may then determine the orientation of the mirror using the collected image in addition to or as an alternative to using the given detection system as described above.

The vehicle's computing devices 110 may determine a first transform based on the determined location of the mirror relative to the given detection system. The first transform may correspond with the vector values of a first ray projected from the given detection system to the determined location of the mirror. In some implementations, the first transform may specifically be based on the location of the mirror corresponding to the detected vehicle portion and/or vehicle fiducial. In the example shown in FIGS. 4A, 4B, and 4C, the first transform may therefore correspond with the spherical coordinates for the location 408 on mirror 300—(4.90 m, 88°, −10°).

Using the given detection system, the vehicle's computing devices 110 may detect one or more characteristics of the detected vehicle portion via the mirror and determine a perceived location and orientation, or perceived pose, of the detected vehicle portion relative to the given detection system. The one or more characteristics of the vehicle portion, such as shape, dimensions, lines, relative position of parts, one or more fiducials on the vehicle portion, or other physical characteristics. The detected vehicle portion may include a wheel of the vehicle. In the example shown in FIGS. 4A, 4B, and 4C, the detected vehicle portion is wheel 212, which includes vehicle fiducial 210. In some implementations, a second detection device, such as a camera, may be used in parallel with the given detection device to detect characteristics of the detected vehicle portion.

The perceived pose of the detected vehicle portion may be determined by the vehicle's computing devices 110 in a same or similar manner as described above with respect to determine the pose of the mirror 300 described above. Known characteristics of the vehicle portion, such as dimensions and shape, may be pre-stored or otherwise accessible to the vehicle's computing devices 110, or, alternatively, an identifier of mirror fiducial 310 may be detected and used to identify the dimensions and shape of the mirror fiducial 310. In some examples, the characteristics of the vehicle portion may be pre-stored in a model such as a CAD file, or other design file representing a 3D model of the vehicle 100, and may also include characteristics and positions of one or more fiducials on the vehicle portion. For the scenario in FIGS. 4A, 4B, and 4C, a known dimension of the vehicle fiducial 210 may be compared with the detected dimensions to determine the perceived location of the vehicle fiducial 210, and the perceived location of the wheel 212 may be extrapolated from the perceived location of the vehicle fiducial 210 using a known position of the vehicle fiducial 210 relative to the wheel 212. The perceived location of the wheel 212 may be determined as 9 meters from the given detection system. A known shape of the vehicle fiducial 210 (circle) may be compared with the detected shape to determine the perceived orientation of the vehicle fiducial 210, and the perceived orientation of the wheel 212 may be extrapolated from the perceived orientation of the vehicle fiducial 210 based on the known position of the vehicle fiducial 210 relative to the wheel 212.

As shown in FIG. 4A, the perceived pose of the detected vehicle portion is different from the actual pose of the vehicle portion. The perceived pose of the detected vehicle portion is part of an imaginary image 410 of the vehicle 100 that is produced behind the mirror 300. The reflected line of sight shown by dashed line portion 406 is perceived as a continued line-of-sight shown by dash-dot line portion 416 that continues straight from the line of sight shown by dashed line portion 404.

To account for this, the vehicle's computing devices 110 may determine a second transform using the pose of the mirror and the perceived pose of the detected vehicle portion. The second transform may correspond with the vector values of a second ray projected from the determined location of the mirror to the actual location of the vehicle portion. The actual pose of the vehicle portion may be determined by modifying the perceived pose of the detected vehicle portion using the pose of the mirror through which the vehicle portion is detected. The angle of the reflection of the mirror and location at which the reflection occurs may therefore be taken into account. The second ray projected may therefore have a magnitude defined as the perceived radial distance of the vehicle portion from the given detection system less the radial distance of the mirror from the given detection system. For the scenario shown in FIGS. 4A, 4B, and 4C, the magnitude of the second ray would therefore be 4.10 meters (9 meters less 4.90 meters). The direction of the second ray may be defined using the direction of the first ray and the determined orientation of the mirror. In particular, the direction of second ray may be the reflection of the direction of the first ray off the mirror.

Using a known position of the vehicle portion on the vehicle and, the vehicle's computing devices 110 may determine a third transform. The third transform may correspond with the vector values of a plurality of third rays projected from the vehicle portion to any other portion of the vehicle or the vehicle as a whole. As noted above, the model may be pre-stored in the memory and accessed by the vehicle's computing devices 110 to determine the third transform. The model may show the vehicle as an assembly of all its component parts, which provides the relative position of all the component parts within the vehicle, and may include the shape and dimensions of each component part. For example, the third transform correspond with the rays between the wheel 212 and each other portion of the vehicle 100.

The vehicle's computing devices 110 may determine the pose of the vehicle 100 relative to the given detection system based on the first, second, and third transforms. For example, the vehicle's computing devices 110 may combine the first, second, and third rays corresponding to the first, second, and third transforms, respectively, to obtain positions of each portion of the vehicle 100 relative to the given detection system. From the positions of the portions of the vehicle 100, the location and orientation, or pose, of the given detection system relative to the vehicle 100 may be determined.

After determining the poses of the given detection system and the vehicle 100 relative to one another, the given detection system may be calibrated so that the coordinate frame of the given detection system matches the coordinate frame of the vehicle 100. A correction to the coordinate frame of the given detection system may be determined as a transform matrix that accounts for rotation and/or translation or other type of coordinate correction value. The correction may be stored in the memory 130 of the vehicle's computing devices 110 and used to operate the given detection system. In this way, the vehicle's computing devices 110 may detect locations of objects in the vehicle's environment using the calibrated given detection system with more accuracy in relation to the vehicle 100. The vehicle 100 may be operated autonomously with the more accurately detected locations of objects.

In addition, a calibration of one or more other detection systems in the plurality of detection systems 174 may be determined based on the calibration of the given detection system.

Figure 5:
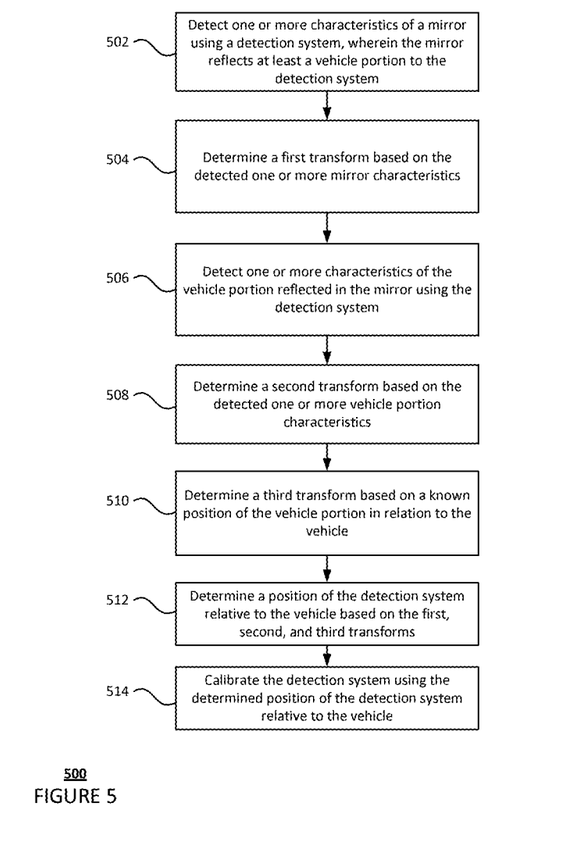
FIG. 5 is an example flow diagram 500 in accordance with aspects of the disclosure.

In FIG. 5, flow diagram 500 depicts a method of calibrating a detection system of the plurality of detection systems 174 of the vehicle 100 according to aspects described above. The method may be performed by the vehicle's computing devices 110 of the vehicle 100. While FIG. 5 shows blocks in a particular order, the order may be varied and that multiple operations may be performed simultaneously. Also, operations may be added or omitted.

At block 502, one or more characteristics of a mirror may be detected using a detection system. The mirror is positioned to reflect at least a vehicle portion to the detection system. In other words, the vehicle portion is detectable by the detection system via the mirror. The one or more mirror characteristics may include a shape of the mirror, a dimension of the mirror, or one or more mirror fiducials. At block 504, a first transform may be determined based on the detected one or more mirror characteristics. The first transform may be related to a location of the mirror relative to the detection system. For example, the first transform may correspond to vector values of a first ray projected from the detection system to the location of the mirror. In some implementations, the location of the mirror may correspond with the location where the vehicle portion is detected in the mirror.

At block 506, one or more vehicle portion characteristics of the vehicle portion may be detected in the mirror using the detection system. The one or more vehicle portion characteristics may include a shape of the vehicle portion, a dimension of the vehicle portion, or one or more vehicle portion fiducials on the vehicle portion. At block 508, a second transform may be determined based on the detected one or more vehicle portion characteristics. For example, the second transform may correspond to vector values of a second ray projected from the location of the mirror to a location of the vehicle portion. Determining the second transform may include adjusting a perceived location and orientation of the vehicle portion based on the location and orientation of the mirror.

At block 510, a third transform may be determined based on a known position of the vehicle portion in relation to the vehicle 100. The known position of the vehicle portion may be from the model stored in the memory and accessible by the vehicle's computing devices 110. The third transform may correspond to vector values of a plurality of third rays projected from the location of the vehicle portion to each other portion of the vehicle 100.

At block 512, a position of the detection system relative to the vehicle 100 may be determined based on the first, second, and third transforms. For example, the first, second, and third rays may be combined to determine where each portion of the vehicle 100 is relative to the detection system. At block 514, the detection system may be calibrated using the determined position of the detection system relative to the vehicle. In particular, a correction to the coordinate frame of the detection system may be determined so that the coordinate frame of the detection system matches that of the vehicle 100. Other detection systems of the plurality of detection systems 174 may be calibrated based on the correction to this detection system.

Alternatively, a remote detection system may be used instead of a mirror. As an example, the remote detection system may include one or more lidar sensors and may be configured to communicate with the vehicle's computing devices 110. The position of the remote detection system relative to the given detection system of the vehicle 100 may be based on the range of the remote detection system and the range of the given detection system. For example, the remote detection system may be positioned such that the range of the remote detection system and the range of the given detection system overlap and are able to detect the same at least one stationary object, such as a wall, a pole, or one or more fiducials in the vehicle's environment. At least a portion of the vehicle 100 should also be in the range of the remote detection system.

The given detection system of the vehicle and the remote detection system may then be used to detect the at least one stationary object. Characteristics of the at least one stationary object, such as shape, dimensions, lines, one or more fiducials, or relative positions to other detected stationary objects, may be detected as well.

The vehicle's computing devices 110 may determine a pose of the remote detection system relative to the given detection system based on the detected at least one stationary object. For example, the pose of the at least one stationary object relative to the remote detection system may be compared with the pose of the same at least one stationary object relative to the given detection system of the vehicle 100. The pose of the remote detection system relative to the given detection system by aligning the two poses based on detected characteristics of the at least one stationary object. A fourth transform may be determined based on the pose of the remote detection system relative to the given detection system.

The remote detection system may also detect at least the vehicle portion, including characteristics of the vehicle portion. The vehicle's computing devices 110 may then determine a pose of the vehicle portion or the vehicle relative to the remote detection system in a same or similar manner as described above with respect to the second transform, such as in block 506 or 508. The vehicle's computing devices 110 may determine a fifth transform based on this determined pose in a same or similar manner as described above with respect to the second transform.

The vehicle's computing devices may then determine the pose of the given detection system relative to the vehicle based on the pose of the vehicle relative to the remote detection system and the pose of the remote detection system relative to the given detection system. For example, the pose of the given detection system relative to the vehicle may be determined by combining the fourth and fifth transforms.

In some implementations, a sixth transform may also be determined using a known position of the vehicle portion on the vehicle in a same or similar manner as described above with respect to the third transform, such as in block 510. The sixth transform may correspond with a position of the vehicle portion relative to any other portion of the vehicle. The model stored in the memory may be accessed by the vehicle's computing devices 110 to determine the sixth transform. The pose of the given detection system may be determined by combining the fourth, fifth, and sixth transforms.

The given detection system may be calibrated after determining the pose of the given detection system to the vehicle so that the coordinate frame of the given detection system matches the coordinate frame of the vehicle 100. The calibration may be performed in a same or similar manner as described above with respect to the method using the mirror.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of calibrating a detection system that is mounted on a vehicle, the method comprising:
   detecting, by one or more computing devices, one or more of a plurality of fiducials positioned around an edge of a mirror positioned in a proximity to the vehicle, wherein the mirror reflects at least a portion of the vehicle to the detection system;
   determining, by the one or more computing devices, a location and orientation of the detected one or more of the plurality of fiducials; and
   calibrating, by the one or more computing devices, the detection system using the determined location and orientation of the detected one or more of the plurality of fiducials, wherein the vehicle is autonomously operated using the calibrated detection system.

2. The method of claim 1, wherein each of the one or more of the plurality of fiducials has particular characteristics including at least one of shape, dimension or relative position with respect to another mirror fiducial.

3. The method of claim 1, wherein each of the one or more of the plurality of fiducials has a unique visual identifier.

4. The method of claim 3, wherein determining the location and orientation of the detected one or more of the plurality of fiducials is based on the unique visual identifier for each of the detected one or more of the plurality of fiducials.

5. The method of claim 1, further comprising:
   determining, by the one or more computing devices, a first transform based on the detected one or more of the plurality of fiducials.

6. The method of claim 5, further comprising:
   detecting, by the one or more computing devices, one or more characteristics of the at least the portion of the vehicle reflected in the mirror using the detection system.

7. The method of claim 6, further comprising:
   determining, by the one or more computing devices, a second transform based on the detected one or more characteristics.

8. The method of claim 7, further comprising:
   determining, by the one or more computing devices, a third transform based on a known position of the vehicle portion in relation to the vehicle.

9. The method of claim 8, further comprising:
   determining, by the one or more computing devices, a position of the detection system relative to the vehicle based on the first transform, the second transform and the third transform.

10. The method of claim 9, further comprising:
    calibrating, by the one or more computing devices, the detection system further using the determined position of the detection system relative to the vehicle.

11. A calibration system comprising:
    a detection system mounted on a vehicle; and
    one or more computing devices configured to:
       detect, using the detection system, one or more of a plurality of fiducials positioned around an edge of a mirror, wherein the mirror reflects at least a portion of the vehicle to the detection system;
       determine a location and orientation of the detected one or more of the plurality of fiducials; and
       calibrate the detection system using the determined location and orientation of the detected one or more of the plurality of fiducials, wherein the vehicle is autonomously operated using the calibrated detection system.

12. The calibration system of claim 11, wherein each of the one or more of the plurality of fiducials has particular characteristics including at least one of shape, dimension or relative position with respect to another mirror fiducial; and
   wherein the one or more computing devices are configured to determine the location and orientation of the detected one or more of the plurality of fiducials is based on the particular characteristics of the detected one or more of the plurality of fiducials.

13. The calibration system of claim 11, wherein each of the one or more of the plurality of fiducials has a unique visual identifier.

14. The calibration system of claim 13, wherein the one or more computing devices are configured to determine the location and orientation of the detected one or more of the plurality of fiducials is based on the unique visual identifier for each of the detected one or more of the plurality of fiducials.

15. The calibration system of claim 11, wherein the one or more computing devices are further configured to determine a first transform based on the detected one or more of the plurality of fiducials.

16. The calibration system of claim 15, wherein the one or more computing devices are further configured to detect one or more characteristics of the at least the portion of the vehicle portion reflected in the mirror using the detection system.

17. The calibration system of claim 16, wherein the one or more computing devices are further configured to determine a second transform based on the detected one or more characteristics, and determine a third transform based on a known position of the vehicle portion in relation to the vehicle.

18. The calibration system of claim 17, wherein the one or more computing devices are further configured to determine a position of the detection system relative to the vehicle based on the first transform, the second transform and the third transform.

19. A mirror used to calibrate a detection system that is mounted on a vehicle, the mirror comprising:
   a reflective surface; and
   a plurality of fiducials positioned around an edge of the reflective surface of the mirror, wherein the mirror is positioned in a proximity to the vehicle.

20. The mirror of claim 19, wherein a first one of the plurality of fiducials is positioned at a first corner of the mirror, a second one of the plurality of fiducials is positioned at a second corner of the mirror, a third one of the plurality of fiducials is positioned at a third corner of the mirror, a fourth one of the plurality of fiducials is positioned at a fourth corner of the mirror, a fifth one of the plurality of fiducials is positioned approximately halfway between the first fiducial and the second fiducial, a sixth one of the plurality of fiducials is positioned approximately halfway between the second fiducial and the third fiducial, a seventh one of the plurality of fiducials is positioned approximately halfway between the third fiducial and the fourth fiducial, and an eighth one of the plurality of fiducials is positioned approximately halfway between the fourth fiducial and the first fiducial.

* * * * *